United States Patent [19]

Dreyer, Jr. et al.

[11] Patent Number: 5,135,301
[45] Date of Patent: Aug. 4, 1992

[54] REFLECTIVE OVERHEAD PROJECTOR WITH ALTERNATE LIGHT SOURCES

[75] Inventors: John F. Dreyer, Jr.; Dennis J. Roden, both of St. Paul, Minn.

[73] Assignee: Minnesota Mining and Manufacturing Company, St. Paul, Minn.

[21] Appl. No.: 643,474

[22] Filed: Jan. 22, 1991

[51] Int. Cl.$^5$ .............................................. G03B 21/20
[52] U.S. Cl. ........................................ 353/85; 353/66; 353/94; 353/DIG. 4
[58] Field of Search ............... 353/94, 65, 66, DIG. 4, 353/85, 87, 98

[56] References Cited

U.S. PATENT DOCUMENTS

| | | |
|---|---|---|
| 3,293,982 | 12/1966 | Appeldorn . |
| 3,529,146 | 9/1970 | Betlejewski et al. ................. 240/37 |
| 4,061,911 | 12/1977 | Krasin .................................... 353/85 |
| 4,338,006 | 7/1982 | Ozeki ..................................... 353/87 |
| 4,565,430 | 1/1986 | Grunwald ............................. 353/94 |
| 4,595,266 | 6/1986 | Kramer ................................. 353/94 |

FOREIGN PATENT DOCUMENTS 2929328  1/1981  Fed. Rep. of Germany ........ 353/94

Primary Examiner—William A. Cuchlinski, Jr.
Assistant Examiner—William C. Dowling
Attorney, Agent, or Firm—Gary L. Griswold; Walter N. Kirn; David W. Anderson

[57] ABSTRACT

A reflective overhead projector is provided with two lamps for the purpose of allowing change from one to the other of the lamps in the event of expiration of the lamp in use. The lamps are arranged to face the center of a circle at which is positioned a rotatable planar mirror which may be turned to direct light from a desired one of the two lamps. An electrical switch senses the position of the mirror and directs electrical power to the appropriate lamp.

5 Claims, 3 Drawing Sheets

REFLECTIVE OVERHEAD PROJECTOR WITH ALTERNATE LIGHT SOURCES

BACKGROUND OF THE INVENTION

1. Field of the Invention

The present invention relates to overhead projectors of the so-called reflective type wherein the light source and projection lens are contained in a projection head supported above a stage on which may be located a transparency to be imaged on a distant vertical surface.

2. Description of the Prior Art

U.S. Pat. No. 3,293,982, assigned to the assignee of the present invention, describes a reflective overhead projector comprising a light source and a projection lens supported above an unsymmetrical reflective stage upon which may be placed a transparency. A transparency is usually in the form of a thin sheet or plate of transparent material on which an image is formed with colored transparent dyes, opaque inks or surface etching. A beam of light is directed from the light source in the projection head, through the transparency to the reflecting surface of the stage. The light reflected by the reflecting surface of the stage again passes through the transparency to a projection lens also located in the projection head and finally directed to, and focused on, a distant, substantially vertical screen.

Existing reflective overhead projectors utilize a single lamp in the projection head as the light source. Thus, if the lamp burns out, the presentation in progress must be halted and the lamp replaced. This situation has resulted in less than total acceptance of reflective overhead projectors, because users are not confident that a presentation will proceed uninterrupted. Thus, despite have tended to prefer transmissive projectors which contain the light source below the stage supporting the transparency. These transmissive projectors have room for multiple lamps which may be alternately energized in the event the lamp in use burns out. This is usually accomplished by operating a slide which carries the burned-out lamp from the system optical axis and carries a fresh lamp into its place. The fresh lamp is automatically energized when it reaches the illumination position. By utilizing this arrangement, the user need only operate the slide in the event of lamp burn-out to continue with his or her presentation.

It would be desirable to supply a reflective overhead projector with an alternate lamp to enable the same sort of worry-free arrangement whereby the lamp may be quickly replaced in the event of burn-out. Heretofore, however, this has not been accomplished because the projection head would be enlarged to an unacceptable degree.

SUMMARY OF THE INVENTION

The present invention overcomes the drawback of prior reflective overhead projectors by providing a projection head which contains two lamps disposed in a single plane and on an arc of a circle at the center of which is located a angled planar mirror. The mirror may be rotated to face one or the other of the lamps and is angled to reflect light from either lamp to the reflective stage. The mirror may be rotated by the user by means of a control knob, and an electrical switch is connected to the mirror to sense the position of the mirror and direct electrical power to the lamp at which the mirror is pointed. Thus, in the event of a lamp burn-out, the user need only turn the mirror by means of the control knob to direct the mirror toward and energize the alternate lamp. With this arrangement, reflective overhead projector users should enjoy the same level of confidence presently associated with transmissive projectors.

DESCRIPTION OF THE DRAWINGS

The present invention will be more particularly described with reference to the accompanying drawings, wherein like numbers refer to like parts in the several views, and wherein:

FIGS. 2 and 3 differ in that a mirror contained within the projection head has been rotated 90°;

DESCRIPTION OF THE PREFERRED EMBODIMENT

Figure 1:
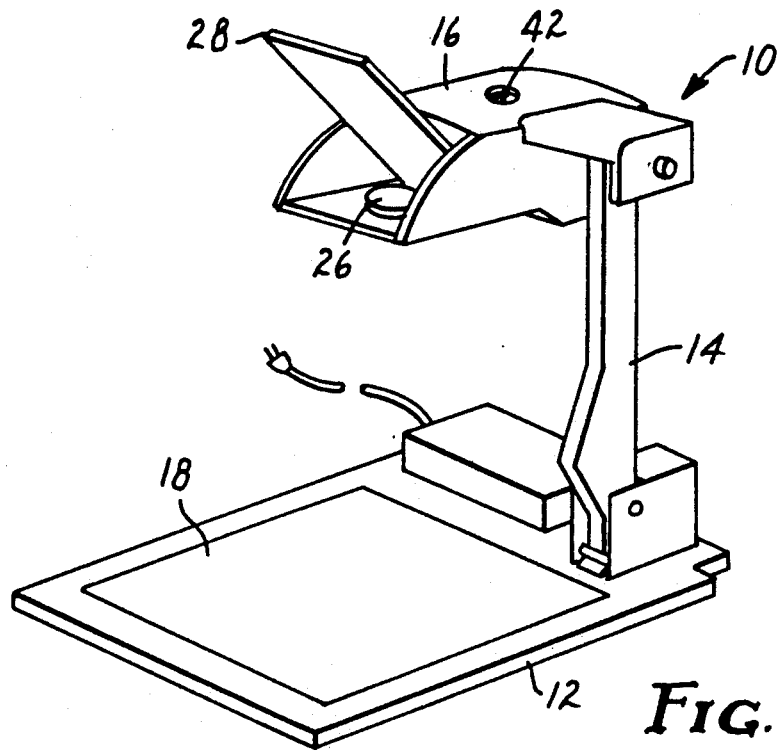
FIG. 1 is a perspective view of a reflective overhead projector of the present invention.

FIG. 1 illustrates a reflective overhead projector, generally referred to as 10, which includes a base 12, a support arm 14 and a projection head 16. The base 12 includes a reflective stage 18, usually in the form of a Fresnel reflector, upon which may be placed a transparency for projection. The support arm 14 spaces the projection head 16 a suitable distance above the stage 18 and conducts electrical wiring to the projection head 16. The projection head 16 encloses two lamps 20 and 22, a planar source mirror 24 (lamps 20 and 22 and source mirror 24 are shown in FIGS. 2-5 only) and a projection lens 26. Hinged to the projection head 16 is a planar projection mirror 28 which is angled to redirect light from the projection lens 26 to a distant viewing screen (not shown). In operation, light from one of the lamps 20 or 22 is directed by the source mirror 24 to and through a transparency located on the reflective stage 18. The stage 18 reflects this light again through the transparency and redirects it to the projection lens 26 and then to the projection mirror 28, where an image of the transparency is directed to the view screen. To simplify the optical elements of the projector 10, it is desirable that the apparent position of the light source 20 or 22 (actually the image of the light source 20 or 22 as it appears in the mirror 24), the center of the Fresnel elements of the stage 18 and the projection lens 26 be located in a single plane perpendicular to the plane of the stage 18.

In prior reflective overhead projectors, a single lamp was utilized as the light source and, when this lamp burned out, the presentation employing the projector had to be interrupted in order to replace the lamp. It was therefore desirable that at least two lamps be provided, with one energized at a time, so that a presenter could easily shift from a first lamp to a second in the event the first lamp expired. Two lamps could have been provided in the projection head, with a switch for energizing one or the other, but difficulties existed relative to proper positioning of the lamps with respect to the other optical elements of the projector. The most desirable solution, as accomplished by the present invention is to have light emitted by either of at least two alternate lamps appear to the stage to be coming from a single point and from a common direction.

As shown in FIGS. 2-5, this solution is achieved by providing two lamps 20 and 22 which lie in a common plane and are disposed at 90° of rotation relative to each other. Both lamps 20 and 22 are aimed at a single point 30 which defines the center of a circle on which the lamps 20 and 22 are located. Located at this center 30 of the circle containing the lamps 20 and 22 is a planar source mirror 24 mounted on a rotatable frame 32. The frame 32 is retained with respect to a plate 34 within the projection head 16 by a formed washer 36 and a fastener 38 extending through the plate 34 and the washer 36. The fastener 38 is grooved to accept a pin 40 attached to a control knob 42 located on the top of the projection head 16.

Figure 4:
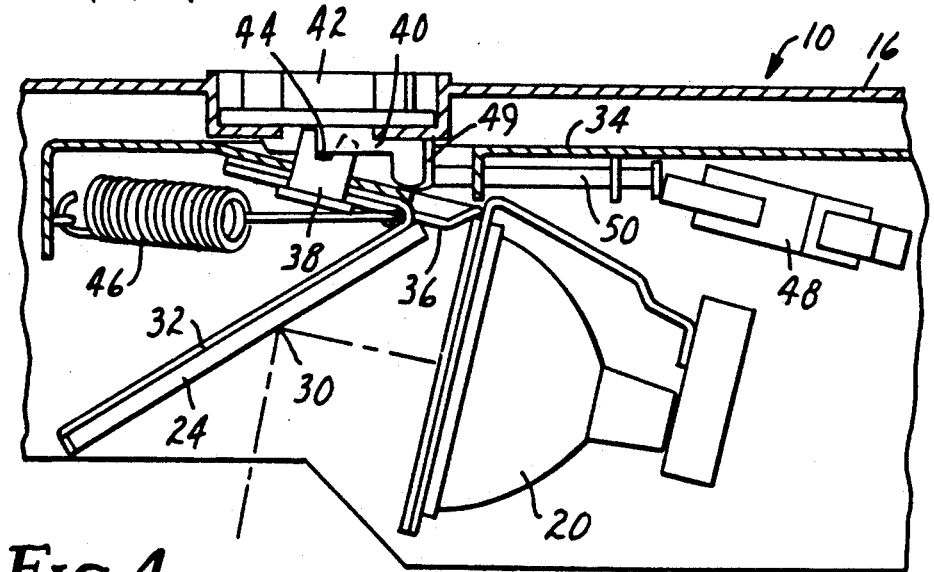
FIG. 4 is a side, elevation view of a portion of the projection head, with a portion of the cover and one lamp removed, taken generally from the perspective of line 4—4 of FIG. 3.
Figure 5:
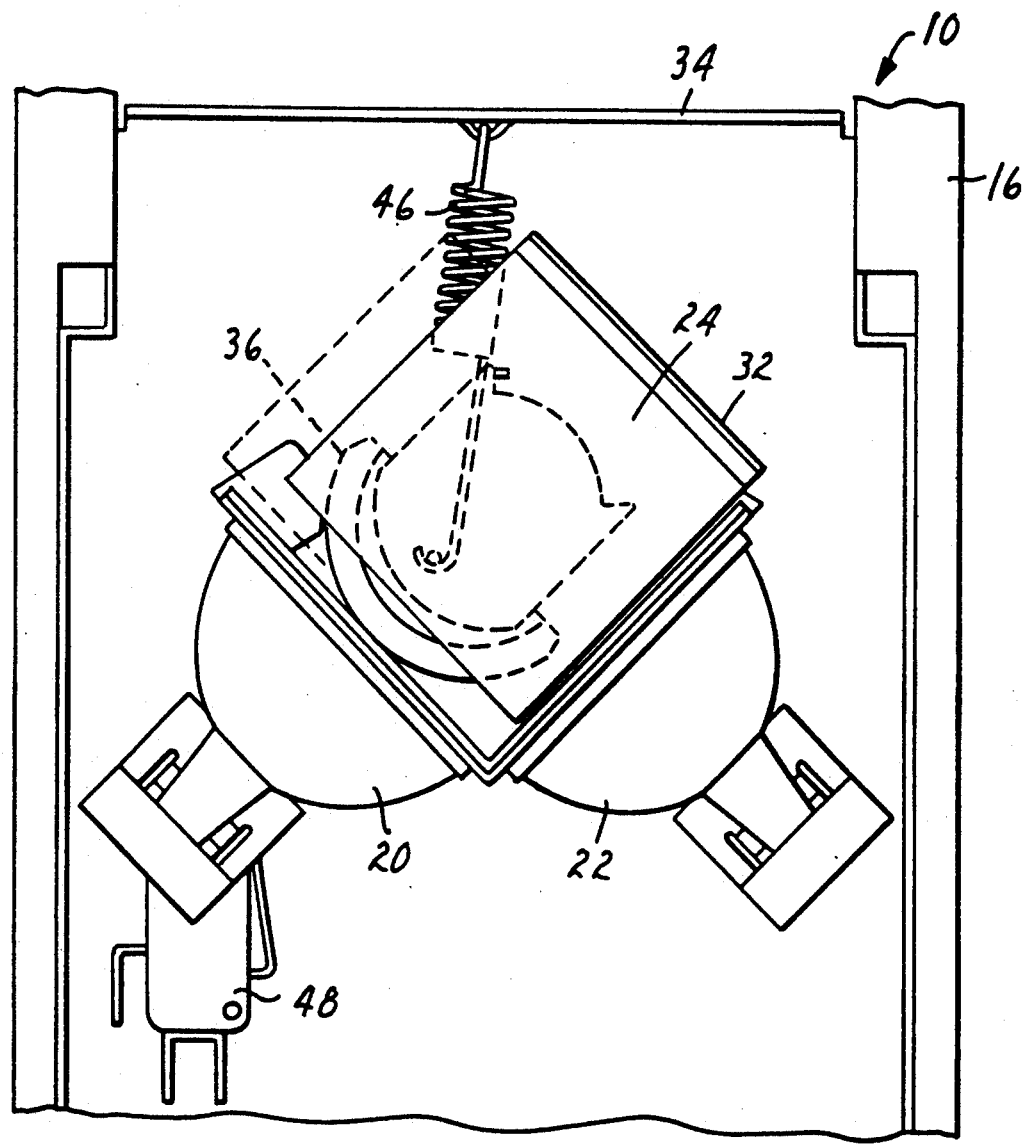
FIG. 5 is a bottom view of a portion of the projection head and corresponds to the mirror position shown in FIG. 3.

As may best be seen in FIG. 4, both lamps 20 and 22, the mirror 24 and its frame 32 are all tilted slightly forward, with respect to the parallel planes of the projection head 16 and the stage 18, at an angle which will cause light from the lamps 20 or 22 to be reflected by the stage 18 to the projection lens 26. This angle causes the edges of the fastener 38 to move toward or away from the control knob pin 40 as the knob 42 is rotated. The groove 44 in the fastener 38 is provided to accommodate this relative movement.

Figure 2:
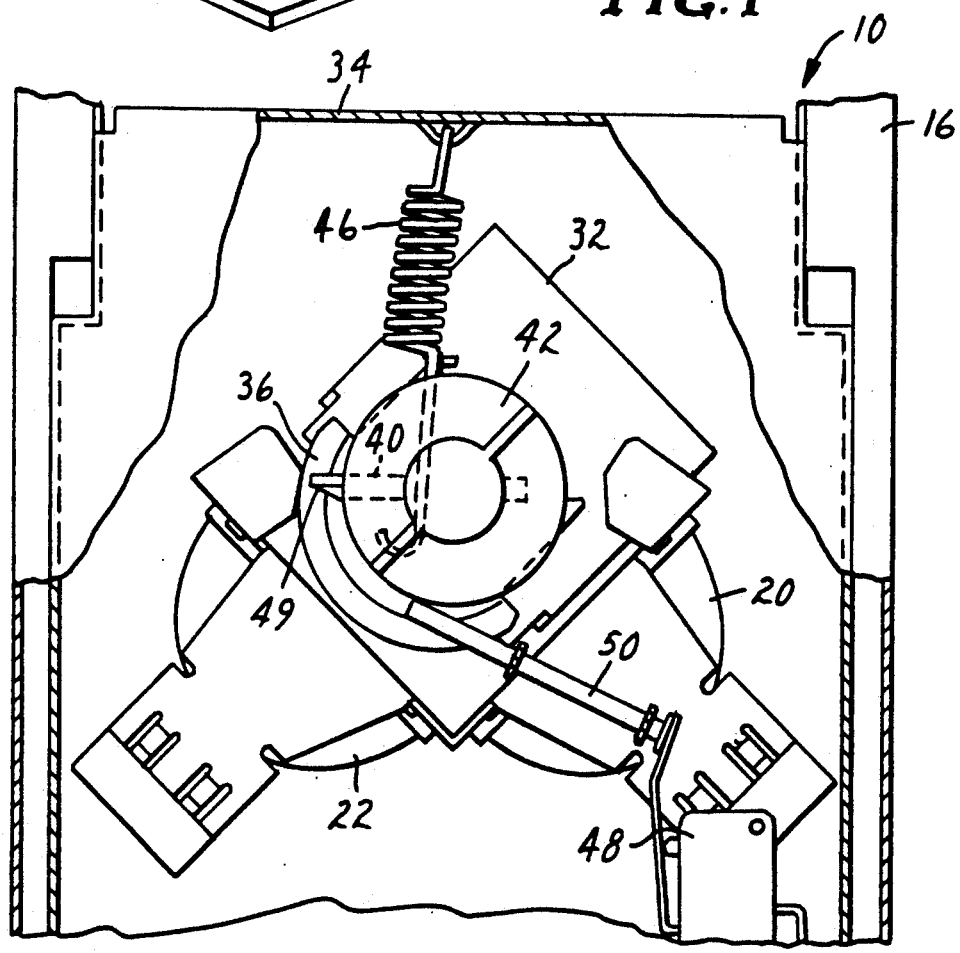
FIGS. 2 and 3 are top, plan views of a portion of a projection head of the reflective overhead projector of FIG. 1, with a portion of the top cover removed.
Figure 3:
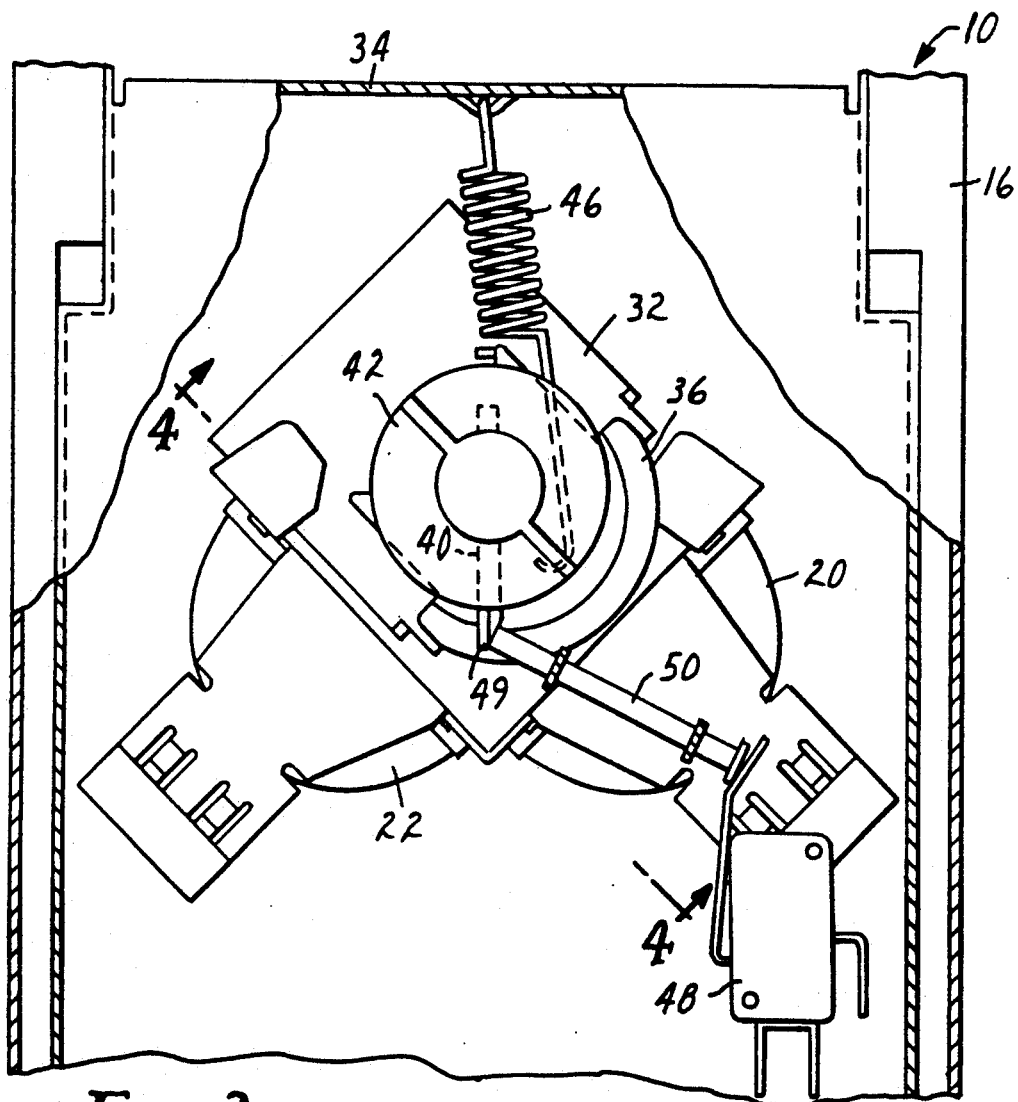

Connected between the plate 34 and the mirror frame 32 is an extension spring 46 which operates on an over-center principle to bias the frame 32 about its pivot axis toward either of the two positions shown in FIGS. 2 and 3. Finally, the control knob 42 is connected to an electrical switch 48 by means of an actuator 49 molded as part of the knob 42 and a push rod 50. The switch 48 thus senses the position of control knob 42 and thus the mirror 24 and directs electrical power to the lamp 20 or 22 toward which the mirror 24 is facing.

In operation, the mirror 24 is turned by means of the control knob 42 to face one or the other of the lamps 20 or 22. The switch 48 is informed of the position of the mirror 24 by either being depressed by the push rod 50 or not, and directs power to the appropriate lamp 20 or 22. If the lamp 20 or 22 in use expires during a presentation, the user can simply turn the control knob 42 to the other position. This will cause the mirror 24 to face the spare lamp 20 or 22 and direct power to that spare lamp 20 or 22. Thus the presentation can continue without great interruption. Of course, the burned-out lamp 20 or 22 will have to be replaced at a later time to allow future reverse operation when the second lamp 20 or 22 burns out.

The present invention has been described with respect to the single embodiment shown in the drawings. However, modifications are possible without departing from the spirit and scope of the invention as defined by the appended claims. For example, the lamps 20 and 22 could be separated by an angle of greater than 90°, and more than two lamps could be provided. The arrangement illustrated is believed preferable because the goal of a replaceable lamp is achieved without wasted volume and consequential enlargement of the projection head 16.

We claim:

1. A lamp changing apparatus comprising:
   at least two light sources located in a common plane and separated by angular rotation of one light source relative to the other, said light sources being located equidistant form the center of a circle on the radii of which are disposed said light sources;
   a planar mirror having a portion disposed at said center of said circle containing said light sources, said mirror being angled to reflect light emitted from one of said light sources;
   means for rotating said mirror between two positions each facing one of said light sources to selectively reflect light from one of said light sources so that the images of both of said light sources in said mirror appear to be identically positioned; and
   an electrical switch for directing electrical power to one or the other of said light sources and means for sensing the position of said mirror and connected to said switch to cause said switch to direct electrical power to the light source facing said mirror.

2. A lamp changing apparatus according to claim 1 wherein said light sources are separated by a ninety degree rotation of one light source relative to the other.

3. A projection head for a reflective overhead projector including a stage supporting a document to be imaged comprising:
   at least two light sources located in a common plane and separated by angular rotation of one light source relative to the other, said light sources being located equidistant form the center of a circle on the radii of which are disposed said light sources;
   a planar mirror having a portion disposed at said center of said circle containing said light sources, said mirror being angled to reflect light emitted from one of said light sources to the stage of the overhead projector;
   a rotatable frame supporting said mirror and means for rotating said frame and said mirror between two positions each facing one of said light sources to selectively reflect light form one of said light sources to the stage of the overhead projector; and
   an electrical switch for directing electrical power to one or the other of said light sources and means for sensing the position of said mirror and connected to said witch to cause said switch to direct electrical power to the light source facing said mirror.

4. A projection head for an overhead projector according to claim 3 wherein said light sources are separated by a ninety degree rotation of one light source relative to the other.

5. A projection head for an overhead projector according to claim 3 wherein said projection head includes a control knob connected to said mirror frame to permit a user to rotate said mirror by rotating said control knob.

* * * * *